United States Patent Office 3,816,545
Patented June 11, 1974

3,816,545
HYDROXYLATION OF AROMATIC COMPOUNDS
Herman S. Bloch, Skokie, Ill., assignor to Universal
Oil Products Company, Des Plaines, Ill.
No Drawing. Filed Feb. 16, 1971, Ser. No. 115,698
Int. Cl. C07c 37/00
U.S. Cl. 260—621 G                        7 Claims

ABSTRACT OF THE DISCLOSURE

An improved process for the hydroxylation of an aromatic compound is effected by treating an aromatic compound with hydrogen peroxide in the presence of a catalyst comprising hydrogen fluoride and also in the presence of a catalyst modifier comprising an organosulfonic acid.

This invention relates to a process for the hydroxylation of aromatic compounds. More particularly the invention is concerned with an improvement in the hydroxylation process of aromatic compounds whereby one or more hydroxyl groups are introduced as substituents in the nucleus of an aromatic compound.

Hydroxylated aromatic compounds will find a wide variety of usage in the chemical field. For example, monohydroxylated aromatic compounds such as phenol or the various isomeric cresols are useful in phenolic resins, as disinfectants, flotation agents, surfactants, scouring compounds, lube oil additives, photographic developers, intermediates in ink, paint and varnish removers, etc.

Polyhydroxylated aromatic compounds such as hydroquinone and catechol are also useful. For example, hydroquinone (1,4-dihydroxybenzene) is utilized in photographic developers, in dye intermediates, in medicine, as an antioxidant for fats and oils, as an inhibitor in coating compounds for rubber, stone and textiles, in paints and varnishes, as well as in motor fuels and oils. In addition, it is also used as an intermediate for preparing mono- and dibenzyl ethers of hydroquinone, the latter compound being used as a stabilizer, as an antioxidant, solvent, as well as being used in perfumes, plastics, and pharmaceuticals. Likewise, catechol (1,2-dihydroxybenzene) finds a wide variety of uses as an antiseptic, in photography, dyestuffs, antioxidant, and light stabilizers, as well as an intermediate for the preparation of the dimethyl ether of catechol which is used as an antiseptic; or as an intermediate for the preparation of the monomethyl ether of catechol which is guaiacol, guaiacol being an important component of many medicines.

In addition, hydroxy substituted aromatic carbohydrate derivatives may be used as intermediates in detergents, water-soluble pharmaceuticals, explosives, gelling agents, surface coatings, resins, and oxidation inhibitors.

It is therefore an object of this invention to provide a process for the preparation of hydroxylated aromatic compounds.

A further object of this invention is to provide an improved process for introduction of hydroxyl substituents in the nucleus of an aromatic compound to provide useful chemical compounds.

In one aspect an embodiment of this invention is found in a process for the nuclear hydroxylation of an aromatic compound having the formula:

$$R_mArX_nH_p$$

in which Ar is a monocyclic or polycyclic aromatic hydrocarbon nucleus, R is independently selected from the group consisting of hydrogen, n-alkyl, sec-alkyl, tert-alkyl, cycloalkyl, hydroxyl, alkoxyl, and hydroxy alkyl radicals, X is independently selected from the group consisting of hydrogen, halogen, and nitro substitutents, and m, n, and p are integers of at least one, which comprises treating said aromatic compounds with hydrogen peroxide at hydroxylation conditions in the presence of a catalyst comprising hydrogen fluoride and a catalyst modifier comprising an organosulfonic acid and recovering the resultant hydroxylated aromatic compound.

A specific embodiment of this invention is found in the process for the nuclear hydroxylation of an aromatic compound which comprises treating benzene with an aqueous solution of hydrogen peroxide containing from about 5% to about 95% hydrogen peroxide at a temperature in the range of from about 0° to about 40° C. and a pressure in the range from about atmospheric to about 100 atmospheres in the presence of a catalyst comprising hydrogen fluoride and a catalyst modifier comprising toluenesulfonic acid, and recovering the resultant mixture of phenol, catechol, and hydroquinone.

Other objects and embodiments will be found in the following further detailed description of the present invention.

As hereinbefore set forth, the present invention is concerned with an improvement in a process for introducing one or more hydroxy substituents on the nucleus or ring of an aromatic compound, said hydroxylation being effected by treating an aromatic compound of the type hereinafter set forth in greater detail with hydrogen peroxide in the presence of a catalyst comprising hydrogen fluoride and a catalyst modifier comprising an organosulfonic acid. By utilizing such a catalyst modifier, the solubility of the aromatic compound in the catalyst phase is increased or improved thereby permitting a more ready hydroxylation of compounds which are otherwise impossible or difficult to hydroxylate. Starting materials which may be utilized in the process of this invention will comprise aromatic compounds. The term "aromatic compounds" as used in the present specification and appended claims will refer to aromatic hydrocarbons and derivatives thereof and will include aromatic hydrocarbons such as benzene, naphthalene, anthracene, chrysene, phenanthrene, etc.; aromatic hydrocarbons containing primary, secondary and tertiary alkyl substituents such as toluene, o-xylene, m-xylene, p-xylene, ethylbenzene, n-propylbenzene, cumene (isopropylbenzene), t-butylbenzene, 1-methylnaphthalene, 2-methylnaphthalene, 1-ethylnaphthalene, 2-ethylnaphthalene, 1,2-dimethylnaphthalene, 1,2-diethylnaphthalene, methylbiphenyl, ethylbiphenyl, cyclohexylbenzene, etc.; hydroxy-substituted aromatic compounds such as phenol, hydroquinone, catechol, resorcinol, 1-hydroxynaphthalene, 2-hydroxynaphthalene, 1,2-dihydroxynaphthalene, etc.; alkoxy-substituted aromatic compounds such as an anisole, phenetole, n-propoxybenzene, o-methylanisole, m-methylanisole, p-methylanisole, m-ethylanisole, o-methylphenetole, m-methylphenetole, p-methylphenetole, etc.; haloalkyl aromatic compounds such as o-chlorotoluene, m-chlorotoluene, p - chlorotoluene, o - bromotoluene, m - bromotoluene, p-bromotoluene, o-chloroethylbenzene, m-chloroethylbenzene, p - chloroethylbenzene, o - bromoethylbenzene, m-bromoethylbenzene, 2-chloro - 1 - methylnaphthalene, 2-bromo-1-methylnaphthalene, 4-chloro-1-methylnaphthalene, 4-bromo - 1 - methylnaphthalene, 2-chloro-1-ethylnaphthalene, 4-bromo-1-ethylnaphthalene, etc.; aromatic carbohydrate derivatives of aromatic compounds such as 1,1-diphenyl-1-desoxy-D-glucitol, 1,1 - ditolyl-1-desoxy-D-glucitol, 1,1-ditolyl-1-desoxy-D-glucitol, 1,1-bis-(p-isopropylphenyl) - 1 - desoxy-D-glucitol, 1,1-bis(p-hydroxyphenyl)-1-desoxy-D-glucitol, the corresponding aromatic derivatives of other hexoses (fructose, sorbose, tagatose, idose, gulose, talose), glycoaldehyde, trioses, tetroses, pentoses, etc. It is to be understood that the aforementioned compounds are only representative of the types of aromatic hydrocarbons and derivatives thereof which may be utilized as starting materials in the hydroxylation process of the present invention and that said invention is not necessarily limited thereto. Utilizable aromatic derivatives may be represented by the following generic formula:

$$R_mArX_nH_p$$

in which Ar is a monocyclic or polycyclic aromatic hydrocarbon nucleus, R is independently selected from the group consisting of hydrogen, n-alkyl, sec-alkyl, tert-alkyl, cycloalkyl, hydroxyl, alkoxyl and hydroxyalkyl radicals, X is independently selected from the group consisting of hydrogen, halogen, and nitro substituents, and m, n, and p are integers of at least one. It is also contemplated within the scope of this invention that heterocyclic compounds such as pyrrole, thiophene, furan, benzofuran, pyran, benzopyran, pyridine, and thiopyran may also be treated with hydrogen peroxide in the presence of a catalyst and catalyst modifier according to the process of this invention, although not necessarily with equivalent results.

As hereinbefore set forth, it has now been discovered that the desired hydroxylated aromatic compounds may be obtained by treating an aromatic compound with hydrogen peroxide in the presence of a hydrogen fluoride catalyst and an organosulfonic acid which acts as a catalyst modifier. As was previously discussed, it has been difficult to hydroxylate certain aromatic compounds including unalkylated benzene or naphthalene derivatives such as benzene, naphthalene, etc.; halobenzenes such as chlorobenzene, bromobenzene, etc.; nitrobenzene, etc. These compounds, in the absence of a catalyst modifier of the type hereinafter set forth in greater detail, will usually react less substantially than the corresponding alkylated, alkoxylated or hydroxylated derivatives and will yield a difficultly separable mixture of derivatives. However, by effecting the hydroxylation in the presence of a catalyst modifier which will improve the solubility of the aromatic compound undergoing hydroxylation, it is now possible to hydroxylate unsubstituted aromatic compounds such as benzene, naphthalene, etc., to obtain the desired mono- or polyhydroxy substituted compounds in a state whereby the separation is easily accomplished with the absence of any high-boiling tarry or high-melting solid mixture which cannot be characterized and makes separation of the desired compound difficult to accomplish.

Likewise, by utilizing a catalyst modifier comprising an organosulfonic acid, it is possible to shorten the addition time of the hydrogen peroxide as well as being able to utilize a lesser amount of the catalyst, that is, a lower inventory of hydrogen fluoride will be required to effect a maximum conversion of the feed stock to the desired hydroxylated derivative. This, in turn, will permit the reaction to be carried out at a decreased cost with a correspondingly more attractive yield on the initial investment for the apparatus required to effect the reaction.

Examples of organosulfonic acids which will act as catalyst modifiers for the process of this invention will include alkanesulfonic acids such as methanesulfonic acid the lower alkanesulfonic acids, ethanesulfonic acid, propanesulfonic acid, butanesulfonic acid, etc., as well as arylsulfonic acids such as benzenesulfonic acid, o-toluenesulfonic acid, m-toluenesulfonic acid, p-toluenesulfonic acid, etc. It is to be understood that the aforementioned acids are only representative of the class of compounds which will act as catalyst modifiers, and that the present invention is not necessarily limited thereto. It is also contemplated within the scope of this invention that the hydroxylation of the aromatic compounds may also be effected with other catalysts such as boron trifluoride, Friedel-Crafts metal halids such as aluminum chloride, ferric chloride, zinc chloride, etc., or other hydroxylation agents including peroxides such as t-butyl peroxide, propionyl peroxide, propionyl hydrogen peroxide, etc., or peracids such as performic acid, peracetic acid, perpropionic acid, perbutyric acid, monoperphthalic acid, per-trifluoroacetic acid; although not necessarily with equivalent results.

The process of this invention is effected by treating an aromatic compound of the type hereinbefore set forth in greater detail with hydrogen peroxide in the presence of a hydrogen fluoride catalyst and also in the presence of an added catalyst modifier at hydroxylation conditions. The hydrogen peroxide may be present in an aqueous solution containing from 5 up to 90% or more hydrogen peroxide. The preferable hydrogen peroxide solution will contain a 30–50% or higher concentration of hydrogen peroxide inasmuch as when utilizing a lesser amount, the aqueous portion of the solution will tend to dilute the catalyst which is preferably charged to the reaction zone in anhydrous form. When the concentration of the hydrogen fluoride in the catalyst complex falls below a figure of about 60 to 70%, the reaction will slow down and eventually cease. Therefore, it is necessary to maintain the concentration of hydrogen fluoride in an amount greater than 60% and preferably greater than 80% and this requirement necessitates the use of a relatively concentrated hydrogen peroxide solution. It is also contemplated, if so desired, that an additional compound such as boron trifluoride of a ferrous fluoborate having the formula:

$$FeF_2 \cdot BF_3$$

may be utilized as a promoter to increase the catalytic acidity and thereby permit the reaction to proceed in such a manner as to provide increased yields of the desired products. In addition, the reaction is effected under hydroxylation conditions which will include temperatures ranging from about −10° up to about 100° C. or more and preferably at a temperature in the range of from about 0° to about 40° C. In addition the reaction pressures which are utilized will range from atmospheric up to about 100 atmospheres or more, the superatmospheric pressure being effected by the introduction of a substantially inert gas such as nitrogen into the reaction vessel, the amount of pressure which is utilized being that which is sufficient to maintain a major portion of the reactants in the liquid phase.

The production of either a monohydroxylated aromatic compound or polyhydroxylated aromatic compound can be varied according to the amount of aromatic compound which is treated with hydrogen peroxide. For example, if a monohydroxylated aromatic compound is desired, an excess of the starting aromatic compound will be used. Conversely, if a polyhydroxylated aromatic compound comprises the desired product, the relative amount of hydrogen peroxide which is used will be increased. Generally speaking, the aromatic compound will be present in a mol ratio in the range of from about 3:1 to about 15:1 mols of aromatic compound per mol of hydrogen peroxide, although greater or lesser amounts of aromatic compounds may also be used.

The process of this invention may be effected in any suitable manner and may comprise either a batch or continuous type operation. For example, when a batch type operation is used, a quantity of the aromatic compound to be hydroxylated is charged to an appropriate apparatus such as, for example, a stirred or rotating autoclave along with the catalyst and catalyst modifier. The autoclave is then adjusted to the desired operating temperature and maintained thereat during the reaction period which may vary from about 0.5 up to about 10 hours or more in duration. During the reaction period, the hydrogen peroxide is added thereto under controlled conditions in order to prevent the exothermic nature of the reaction from becoming too vigorous whereby the optimum yield of the desired product will be jeopardized. Upon completion of the desired residence time, the excess pressure is vented and the catalyst is purged from the reactor utilizing a stream of an inert gas such as nitrogen as the purging agent. The reaction mixture is thereafter recovered from the reactor and subjected to conventional means for recovering the desired product, said means including washing the mixture with an inert organic solvent, neutralizing any hydrogen fluoride which still may be present, flashing off the solvent and subjecting the reaction mixture to fractional distillation to recover the desired compound.

It is also contemplated within the scope of this invention that the process described herein may be effected in a continuous manner of operation. When such a type of operation is used, the aromatic compound is continuously charged to a reaction zone which is maintained at the proper operating conditions of temperature and pressure, said reaction zone also containing the hydrogen fluoride catalyst and organosulfonic acid catalyst modifier. In addition, the hydrogen peroxide in the form of an aqueous solution containing from 5% up to about 90% or more hydrogen peroxide is also continuously charged to the reaction zone. Upon completion of the desired residence time, the reactor effluent is continuously withdrawn from the reactor and subjected to treatment similar to that hereinbefore set forth to recover the desired hydroxylated aromatic compounds.

Examples of hydroxylated aromatic compounds which may be prepared according to the process of this invention include phenol,
catechol,
hydroquinone,
hydroxyquinone,
pyrogallol,
guaiacol,
o-hydroxytoluene-(o-cresol),
p-hydroxytolune-(p-cresol),
2-hydroxy-p-xylene,
4-hydroxy-o-xylene,
2-hydroxyethylbenzene-(o-ethylphenol),
2,4-dihydroxyethylbenzene,
2-hydroxy-p-cymene,
2-hydroxycumene,
4-hydroxycumene,
2-hydroxy-t-butylbenzene,
4-hydroxy-t-butylbenzene,
1-hydroxynaphthalene,
2-hydroxynaphthalene,
1,2-dihydroxynaphthalene,
2-hydroxy-1-methylnaphthalene,
2,4-dihydroxy-1-methylnaphthalene,
1-hydroxy-2-methylnaphthalene,
1,4-dihydroxy-2-methylnaphthalene,
2-hydroxy-1-methylanthracene,
2,4-hydroxy-1-methylanthracene,
2-hydroxyphenetole,
2,4-dihydroxyanisole,
2,4-dihydroxyphenetole,
2-hydroxy-p-methylanisole,
2-hydroxy-p-ethylanisole,
2-hydroxychlorobenzene,
4-hydroxybromobenzene,
4-hydroxychlorobenzene,
2,4-dihydroxychlorobenzene,
2-hydroxynitrobenzene,
4-hydroxynitrobenzene,
2,4-dihydroxynitrobenzene,
2-hydroxy-o-chlorotoluene,
2-hydroxy-o-bromotoluene,
4-hydroxy-o-chlorotoluene,
4-hydroxy-o-bromotoluene,
5-hydroxy-o-chlorotoluene,
5-hydroxy-o-bromotoluene,
1,1-di-(p-hydroxyphenyl)-1-desoxy-D-mannitol,
1,1-di-(p-hydroxyphenyl)-1-desoxy-D-glucitol, etc.

It is to be understood that the aforementioned compounds are only representative of the class of hydroxylated aromatic compounds which may be prepared by hydroxylating an aromatic compound by treatment with hydrogen peroxide in the presence of a hydrogen fluoride-organosulfonic acid catalyst mixture and that the present invention is not necessarily limited thereto.

EXAMPLE I

To a stainless steel turbomixer autoclave was added 234 g. (3.0 mol) of benzene. Following this, 430 g. (21.5 mol) of hydrogen fluoride were charged thereto along with 8.5 wt. percent of the catalyst phase of p-toluenesulfonic acid. Thereafter 0.2 mols of a 30% hydrogen peroxide solution was slowly charged thereto during a period of 20 minutes while maintaining the temperature of the autoclave at about 20° C. Upon completion of the addition of the hydrogen peroxide, the autoclave was stirred for an additional period of 30 minutes. At the end of this time, the pressure was vented and the hydrogen fluoride was swept out of the autoclave utilizing a stream of nitrogen during a period of 2 hours before the autoclave was opened.

The reaction mixture was transferred to a beaker and the reactor parts were washed with benzene, the wash being added to the product. The solution was thereafter decanted to another vessel thereby separating out a small amount of an aqueous acid phase which cotnained some benzene-insoluble product. The decanted benzene solution was treated to remove residual hydrogen fluoride, filtered under suction and distilled to remove the benzene. The benzene-insoluble product which remained in the reactor was combined with that product in the aqueous acid phase and extracted with ether. Thereafter the bottoms from both products were combined and subjected to fractional distillation under reduced pressure. Analysis of a selected cut by means of infra-red disclosed a yield of 38 mol percent phenol, 7 mol percent catechol and 9 mol percent hydroquinone.

A similar experiment carried out in the absence of the toluene sulfonic acid yielded no detectable amounts of phenol, catechol or hydroquinone. The only product was about 1% (based on benzene charged) of a high-boiling, high-melting, black, alkali-soluble resin.

EXAMPLE II

In this experiment 256 g. (2.0 mol) of naphthalene is placed in a stainless steel turbomixer autoclave. The autoclave is sealed and 300 g. (15 mols) of hydrogen fluoride is charged thereto along with a catalyst modifier consisting of 10 wt. percent of the catalyst of benzenesulfonic acid. While maintaining the autoclave at a temperature of about 20° C., 0.2 mol of a 30% aqueous hydrogen peroxide solution is charged to the autoclave during a period of about 25 minutes. At the end of the addition of the hydrogen peroxide, mixing is continued for another 15 minutes after which the excess pressure is discharged. The autoclave is then purged with a stream of nitrogen during a period of 2 hours and opened. The reaction product is recovered, the autoclave is washed with benzene and the washings are combined with the reaction product. Upon decantation of the solution, a phase separation occurs, the two phases being subjected to a treatment similar to that set forth in Example I above. Distillation of the bottoms under reduced pressure results in the recovery of a mixture of mono- and dihydroxynaphthalenes.

A similar experiment carried out without the benzenesulfonic acid yielded no detectable naphthols; the only product was about 17% (based on naphthalene charged) of a high-boiling, high-melting, black, alkali-soluble resin.

EXAMPLE III

In this example 184 g. (2.0 mol) of toluene is placed in a stainless steel turbomixer autoclave after which 400 g. (20 mol) of anhydrous hydrogen fluoride is added thereto. In addition, a catalyst modifier comprising 10 wt. percent of p-toluenesulfonic acid is also placed in the autoclave which is thereafter sealed. The autoclave is maintained at a temperature of about 15° C. by means of an ice bath while 0.2 mols of aqueous hydrogen peroxide is slowly added thereto during a period of 20 minutes. At the end of the hydrogen peroxide addition, the mixture is continuously stirred for an additional period of 30 minutes. At the end of this time, the excess pressure is discharged, and the autoclave is purged by passing a stream of nitrogen thereto for a period of 2 hours. The reaction mixture is then recovered and treated in a manner similar to that set forth in Example I above, whereby the desired product comprising a mixture of cresols is recovered.

EXAMPLE IV

In like manner 282 g. (3.0 mol) of phenol is placed in the glass liner of a rotating autoclave and 240 g. (12 mols) of hydrogen fluoride is added thereto. In addition, an amount of benzenesulfonic acid corresponding to 10 wt. percent of the hydrogen fluoride is also added thereto, and the autoclave is sealed. The temperature is reduced to 15° C. by means of an ice bath and is maintained thereat while 0.2 mols of an aqueous hydrogen peroxide solution is slowly added thereto during a period of 25 minutes. Upon completion of the addition of the hydrogen peroxide, the mixture is stirred for an addition period of 15 minutes and thereafter the excess pressure is discharged. The catalyst is purged by passing nitrogen through the autoclave for a period of 2 hours following which the autoclave is opened. The reaction mixture is recovered, the autoclave is washed with benzene and the washings combined with the reaction mixture. Upon decanting the combined mixture into a second vessel, a phase separation will occur. The two phases are treated in a manner similar to that set forth in the above examples. After distillation of the bottoms under reduced pressure, the desired product which comprises a mixture of catechol, hydroquinone and a small amount of trihydroxybenzenes is recovered.

EXAMPLE V

A charge stock comprising 216 g. (2.0 mol) of anisole is added to the glass liner of a rotating autoclave along with 400 g. (20 mol) of an anhydrous hydrogen fluoride. In addition, an amount of benzenesulfonic acid equivalent to 10 wt. percent of the hydrogen fluoride catalyst is also added thereto and the autoclave is sealed. The autoclave is then cooled to a temperature of 15° C. by means of an ice bath and maintained thereat while 0.2 mols of an aqueous hydrogen peroxide solution is slowly added in incremental fashion during a period of 35 minutes. Upon completion of the addition of the hydrogen peroxide, the mixture is stirred for an additional period of 30 minutes, following which the excess pressure is discharged and the autoclave purged by passing a stream of nitrogen therethrough for a period of 2 hours. The reaction mixture is recovered from the autoclave and treated in a manner similar to that hereinbefore set forth in the above examples. After work-up of the reaction mixture and distillation under reduced pressure of the bottoms, the desired product comprising a mixture principally of o-methoxyphenol and p-methoxyphenol is recovered therefrom.

I claim as my invention:

1. A process for the nuclear hydroxylation of an aromatic compound selected from the group consisting of benzene, naphthalene, chlorobenzene, bromobenzene and nitrobenzene, which comprises reacting said aromatic compound with hydrogen peroxide at a hydroxylation temperature of from about −10° to about 100° C. and a pressure of from about atmospheric to about 100 atmospheres in the presence of a catalyst comprising hydrogen fluoride and a catalyst modifier comprising a lower alkanesulfonic acid, benzenesulfonic acid or toluenesulfonic acid, and recovering the resultant hydroxylated aromatic compound.

2. The process as set forth in claim 1 in which said hydroxylation is effected at a temperature in the range of from about 0° to about 40° C. and a pressure in the range of from about atmospheric to about 100 atmospheres.

3. The process as set forth in claim 1 in which said hydrogen peroxide is an aqueous hydrogen peroxide solution containing from about 5% to about 90% hydrogen peroxide.

4. The process as set forth in claim 1 in which said catalyst modifier is p-toluenesulfonic acid.

5. The process as set forth in claim 1 in which said catalyst modifier is benzenesulfonic acid.

6. The process as set forth in claim 1 in which said aromatic compound is benzene.

7. The process as set forth in claim 1 in which said aromatic compound is naphthalene.

References Cited

UNITED STATES PATENTS

| | | | |
|---|---|---|---|
| 3,407,237 | 10/1968 | Vesely | 260—621 G |
| 3,461,170 | 8/1969 | Schmerling | 260—621 G X |
| 3,481,989 | 12/1969 | Vesely et al. | 260—621 G X |

FOREIGN PATENTS

| | | | |
|---|---|---|---|
| 723,454 | 2/1955 | France | 260—621 |

OTHER REFERENCES

McCutcheon: Synthetic Detergents (1950), p. 273.

BERNARD HELFIN, Primary Examiner

U.S. Cl. X.R.

20—622 R, 623 R, 613 D, 624 R, 625, 620, 619 R